(12) United States Patent
Ishiguro et al.

(10) Patent No.: US 11,897,048 B2
(45) Date of Patent: Feb. 13, 2024

(54) FRICTION STIR WELDING APPARATUS AND FRICTION STIR WELDING METHOD

(71) Applicant: Hitachi Power Solutions Co., Ltd., Hitachi (JP)

(72) Inventors: Koichi Ishiguro, Hitachi (JP); Shun Shinohara, Hitachi (JP); Kohei Funahara, Hitachi (JP); Shouzou Miyabe, Hitachi (JP); Iwao Nakajima, Hitachi (JP)

(73) Assignee: Hitachi Power Solutions Co., Ltd., Hitachi (JP)

( * ) Notice: Subject to any disclaimer, the term of this patent is extended or adjusted under 35 U.S.C. 154(b) by 62 days.

(21) Appl. No.: 17/451,575

(22) Filed: Oct. 20, 2021

(65) Prior Publication Data

US 2022/0126394 A1     Apr. 28, 2022

(30) Foreign Application Priority Data

Oct. 28, 2020   (JP) ................................ 2020-180346

(51) Int. Cl.
*B23K 20/00*     (2006.01)
*B23K 20/12*     (2006.01)

(52) U.S. Cl.
CPC .......... *B23K 20/123* (2013.01); *B23K 20/125* (2013.01); *B23K 20/1255* (2013.01)

(58) Field of Classification Search
CPC .............. B23K 20/123; B23K 20/1205; B23K 20/1225; B23K 20/1245

See application file for complete search history.

(56) References Cited

U.S. PATENT DOCUMENTS

| | | | | |
|---|---|---|---|---|
| 6,050,475 A | * | 4/2000 | Kinton | B23K 20/121 228/2.1 |
| 7,537,150 B2 | * | 5/2009 | Burton | G01L 25/00 228/103 |

(Continued)

FOREIGN PATENT DOCUMENTS

| | | |
|---|---|---|
| CN | 110385519 A | 10/2019 |
| JP | 2003-80380 A | 3/2003 |

(Continued)

OTHER PUBLICATIONS

Extended European Search Report issued in European Application No. 21203194.2 dated Mar. 28, 2022 (eight (8) pages).

(Continued)

*Primary Examiner* — Erin B Saad
(74) *Attorney, Agent, or Firm* — Crowell & Moring LLP

(57) ABSTRACT

A friction stir welding apparatus includes a welding tool that includes a shoulder and a probe supported by the shoulder, is inserted into a plurality of welding target members, and moves while rotating to weld the plurality of welding target members, a spindle motor that is coupled to the welding tool to rotate the welding tool in a predetermined direction, a welding head that supports the spindle motor, and an apparatus body that supports the welding head, applies a drive signal to the spindle motor, and moves the welding tool along a welding line while rotating the welding tool. The apparatus body has a first correction mode in which a welding tool position indicating a position of the welding tool in a Z-axis direction is corrected based on a variable correction quantity calculated by a predetermined operational expression according to a fluctuation quantity of a state quantity indicating a control quantity of the welding head in a Z-axis upper direction or a Z-axis lower direction when friction stir welding is performed on the welding target members by the welding tool, and a second correction mode (Continued)

in which the welding tool position is corrected based on a preset fixed correction quantity according to the fluctuation quantity.

14 Claims, 7 Drawing Sheets

(56) References Cited

U.S. PATENT DOCUMENTS

| | | | | |
|---|---|---|---|---|
| 7,617,965 | B2* | 11/2009 | Burton | G01L 5/0076 |
| | | | | 228/103 |
| 2003/0047584 | A1 | 3/2003 | Okamoto et al. | |
| 2005/0006441 | A1* | 1/2005 | Adams | B23K 20/123 |
| | | | | 228/114.5 |
| 2008/0127751 | A1* | 6/2008 | Burton | B23K 20/121 |
| | | | | 73/862.381 |
| 2009/0193910 | A1* | 8/2009 | Burton | B23K 20/123 |
| | | | | 73/862.041 |
| 2021/0086291 | A1 | 3/2021 | Okada et al. | |
| 2021/0316390 | A1* | 10/2021 | Ishiguro | B23K 20/125 |

FOREIGN PATENT DOCUMENTS

| | | |
|---|---|---|
| JP | 2003-136255 A | 5/2003 |
| JP | 2020-49532 A | 4/2020 |
| WO | WO 2019/045102 A1 | 3/2019 |
| WO | WO 2020/059686 A1 | 3/2020 |

OTHER PUBLICATIONS

Japanese-language Office Action issued in Japanese Application No. 2020-180346 dated Jan. 12, 2021 with English translation (three (3) pages).

* cited by examiner

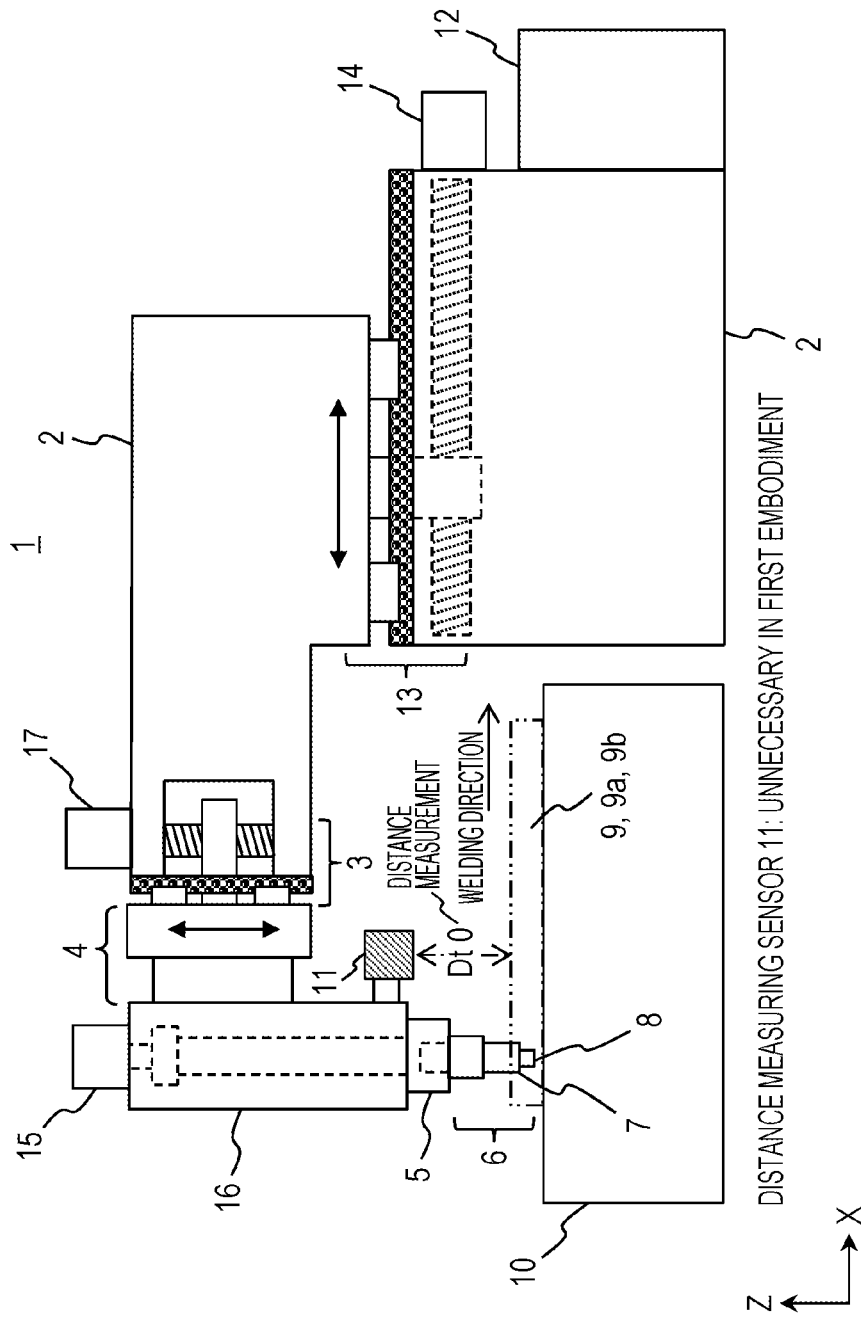

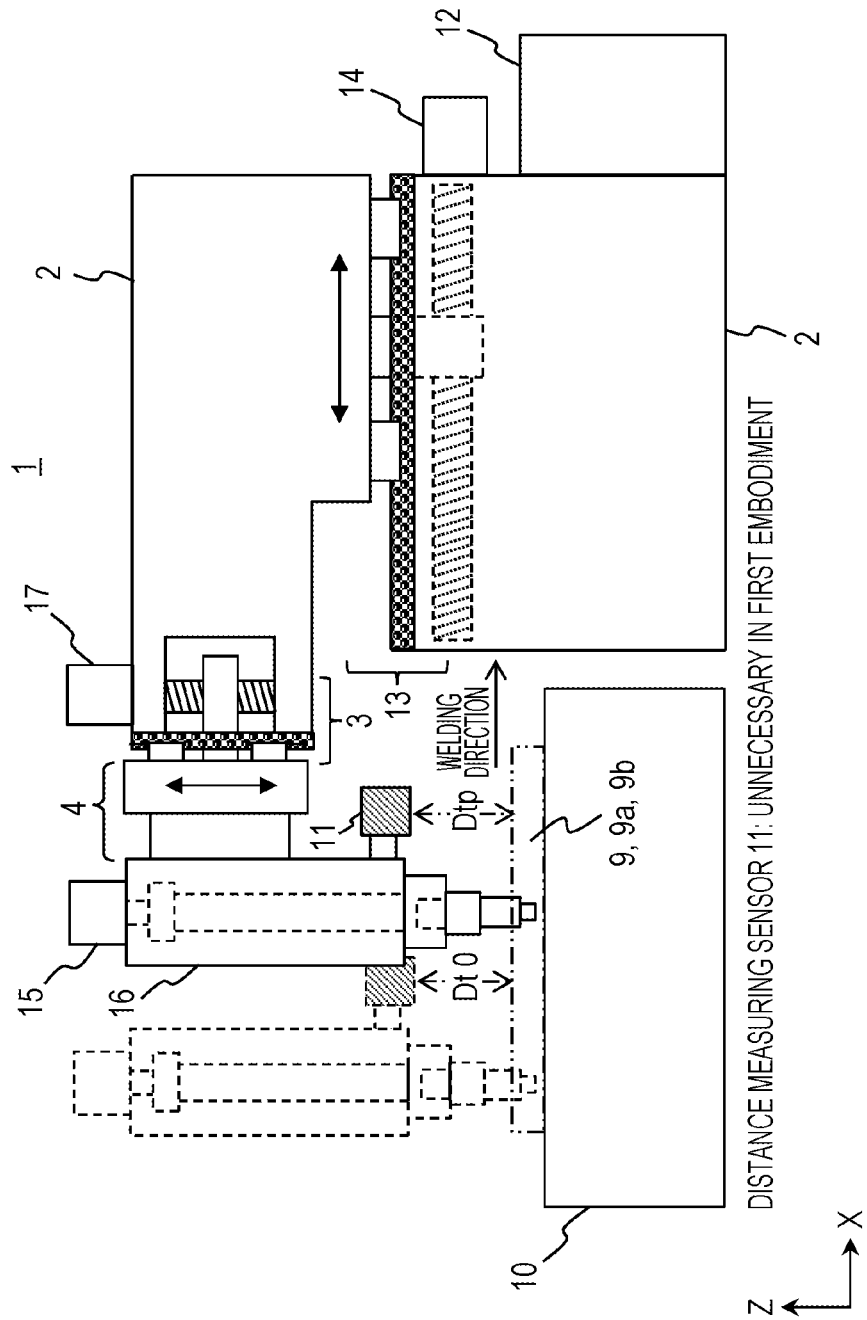

FIG. 5

| QUANTITY EXCEEDING CONTROL LIMIT VALUE (UPPER LIMIT) | QUANTITY EXCEEDING CONTROL LIMIT VALUE (LOWER LIMIT) | FIXED CORRECTION QUANTITY |
|---|---|---|
| QUANTITY 1 | QUANTITY 2 | FIXED CORRECTION QUANTITY 1 |
| QUANTITY 3 | QUANTITY 4 | FIXED CORRECTION QUANTITY 2 |
| QUANTITY 5 | QUANTITY 6 | FIXED CORRECTION QUANTITY 3 |
| QUANTITY 7 | QUANTITY 8 | FIXED CORRECTION QUANTITY 4 |

US 11,897,048 B2

FRICTION STIR WELDING APPARATUS AND FRICTION STIR WELDING METHOD

CLAIM OF PRIORITY

The present application claims priority from Japanese Patent application serial no. 2020-180346, filed on Oct. 28, 2020, the content of which is hereby incorporated by reference into this application.

BACKGROUND OF THE INVENTION

1. Field of the Invention

The present invention relates to a friction stir welding apparatus and a friction stir welding method for welding welding target members to each other by friction stir welding, and particularly relates to a technology effective for welding welding target members that are required to be welded with high quality (high accuracy).

2. Description of the Related Art

Since friction stir welding (FSW) in which welding target materials are welded to each other by softening the welding target materials by frictional heat generated by rotating a cylindrical welding tool and stirring the softened portion does not use a material other than the welding target material, this material has high fatigue strength and is not melted, and thus, welding with less welding deformation (strain) can be performed. Application in a wide range of fields such as bodies of aircraft and automobiles is expected.

In a friction stir welding apparatus (FSW apparatus), in order to secure welding quality required for welding target members, a welding tool position is controlled such that a reference range including a reference value of a state quantity indicating an appropriate control quantity of a welding head in a Z-axis upper direction or a Z-axis lower direction is set based on welding conditions set according to a state such as a material or a thickness of the welding target member and the state quantity is maintained in the reference range. Thus, when the state quantity is out of the reference range, it is necessary to correct the welding tool position such that the welding tool position quickly returns to the reference range.

For example, JP 2003-80380 A is a background art of the present technical field. JP 2003-80380 A discloses "a friction stir welding apparatus that welds welding target materials by inserting a rotating tool into the welding target materials and moving the tool relative to the welding target materials, and the friction stir welding apparatus includes a control device that controls a tool position according to a state quantity during welding in an insertion direction of the tool into the welding target materials such that a load of a spindle motor that rotates the tool or a current value flowing in the spindle motor is within a predetermined range".

SUMMARY OF THE INVENTION

In JP 2003-80380 A described above, when a load factor indicated by a ratio (%) obtained by setting load torque rated value of the spindle motor to 100% exceeds a predetermined range, the load factor falls within the predetermined range by correcting the position (welding tool position) of the welding tool in a vertical direction (Z-axis direction).

Specifically, when the load factor exceeds the predetermined range, the welding tool position is corrected according to a preset correction value per one time (hereinafter, also simply referred to as a correction value) according to the exceeded quantity. This correction is repeated until the load factor falls within the predetermined range. In JP 2003-80380 A, a "fixed quantity correction value" in which a correction value for correcting a Z-axis position is set in advance is used.

In this method, when the load factor exceeds the predetermined range, the welding tool position is corrected stepwise according to the exceeded quantity. When the quantity by which the load factor exceeds the predetermined range (a range in which required welding quality cannot be maintained), this method is an effective correction method to set a large correction value within a range in which the load factor does not overshoot to an opposite side when the welding tool position is corrected and to return the load factor to a range in which the required welding quality can be quickly maintained.

However, it has been found that this method is not necessarily an appropriate correction method when the quantity by which the load factor exceeds the predetermined range is small and is within the range in which the required welding quality can be maintained. This range is a range in which the required quality can be maintained, and is out of a target to be corrected and correction is not performed in this range in JP 2003-80380 A.

Accordingly, since the friction stir welding apparatus of JP 2003-80380 A starts the correction after the load factor exceeds this range and the correction value per one time becomes a large value, this friction stir welding apparatus is not preferable in terms of welding quality, and thus, it has been found that welding with higher quality can be performed by appropriately correcting the welding tool position even within this range.

Therefore, an object of the present invention is to provide a friction stir welding apparatus and a friction stir welding method capable of, when a state quantity at the time of welding welding target members by the friction stir welding apparatus exceeds a predetermined range, accurately correcting a welding tool position in a short time according to the exceeded quantity and returning the state quantity to the predetermined range.

In order to solve the above problem, the present invention is a friction stir welding apparatus including a welding tool that includes a shoulder and a probe supported by the shoulder, is inserted into a plurality of welding target members, and moves while rotating to weld the plurality of welding target members, a spindle motor that is coupled to the welding tool to rotate the welding tool in a predetermined direction, a welding head that supports the spindle motor, and an apparatus body that supports the welding head, applies a drive signal to the spindle motor, and moves the welding tool along a welding line while rotating the welding tool. The apparatus body has a first correction mode in which a welding tool position indicating a position of the welding tool in a Z-axis direction is corrected based on a variable correction quantity calculated by a predetermined operational expression according to a fluctuation quantity of a state quantity indicating a control quantity of the welding head in a Z-axis upper direction or a Z-axis lower direction when friction stir welding is performed on the welding target members by the welding tool, and a second correction mode in which the welding tool position is corrected based on a preset fixed correction quantity according to the fluctuation quantity.

The present invention is a friction stir welding method for welding welding target members by friction stir welding.

The method includes (a) setting a reference state quantity and a predetermined state quantity range before the friction stir welding is started, (b) measuring a current state quantity during the friction stir welding, (c) calculating, as a fluctuation quantity of the state quantity, a deviation between the current state quantity and the predetermined state quantity range, and (d) comparing the current state quantity with the predetermined state quantity range. A first correction mode in which a welding tool position indicating a position of a welding tool in a Z-axis direction is corrected based on a variable correction quantity calculated by a predetermined operational expression is executed according to the deviation when the current state quantity measured in (b) is within the predetermined state quantity range, and a second correction mode in which the welding tool position is corrected based on a preset fixed correction quantity is executed when the current state quantity measured in (b) exceeds the predetermined state quantity range in a direction of being further separated from the reference state quantity.

According to the present invention, when the state quantity exceeds a predetermined range at the time of performing stir welding on the welding target members in the friction stir welding apparatus, it is possible to realize the friction stir welding apparatus and the friction stir welding method capable of accurately correcting the welding tool position in a short time according to the exceeded quantity.

Accordingly, it is possible to perform high quality (high accuracy) friction stir welding of the welding target members.

Other objects, configurations, and effects will be made apparent in the following descriptions of the embodiments.

BRIEF DESCRIPTION OF THE DRAWINGS

FIG. 1 is a diagram illustrating an overall outline of a friction stir welding apparatus according to a first embodiment of the present invention;

FIG. 2 is a diagram illustrating an overall outline of the friction stir welding apparatus according to the first embodiment of the present invention;

FIG. 5 is a diagram illustrating an example of a database of a fixed correction quantity in a second range (torque control);

DESCRIPTION OF THE PREFERRED EMBODIMENTS

Figure 3A:
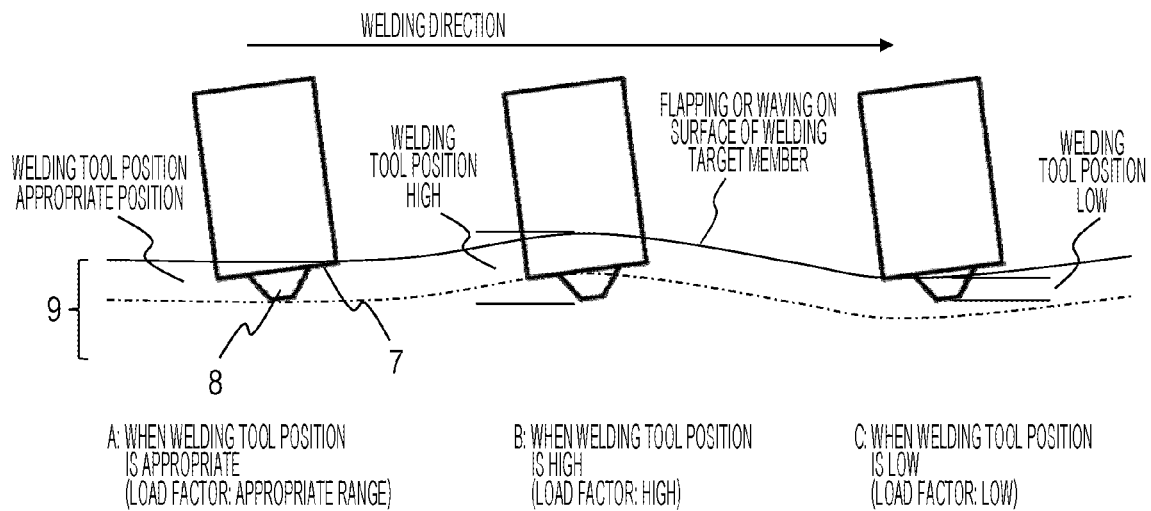
FIG. 3A is a diagram conceptually illustrating a relationship between a welding tool position and a load factor of a spindle motor.

Hereinafter, embodiments of the present invention will be described with reference to the drawings. In the drawings, the same configurations are denoted by the same reference signs, and the detailed description of redundant portions will be omitted.

First Embodiment

Basic Control According to Present Embodiment

In a friction stir welding apparatus and a friction stir welding method according to the present embodiment, a Z-axis upper and lower movement drive mechanism is controlled such that a welding tool position is corrected in a vertical lower direction (Z-axis lower direction) by an absolute value of a calculated correction quantity when a state quantity in a current time (current state quantity) during friction stir welding is smaller than a reference state quantity indicating a normal range of the state quantity and the welding tool position is corrected in a vertical upper direction (Z-axis upper direction) by the absolute value of the calculated correction value when the current state quantity is larger than the reference state quantity.

In the present embodiment, friction stir welding in which the welding tool position is adjusted (corrected) by using load torque (load factor) of a spindle motor will be described as the "state quantity".

A friction stir welding apparatus and a friction stir welding method according to a first embodiment of the present invention will be described with reference to FIGS. 1 to 3A and 4 to 6. FIGS. 1 and 2 are diagrams illustrating an overall outline of a friction stir welding apparatus 1 according to the present embodiment. FIG. 1 illustrates a state before the friction stir welding is started, and FIG. 2 illustrates a state during welding in which the friction stir welding is performed by inserting a welding tool 6 into welding target members 9 (9a and 9b).

As illustrated in FIG. 1, the friction stir welding apparatus 1 according to the present embodiment includes, as main components, an apparatus body 2, a spindle support 4 connected to the apparatus body 2 with a Z-axis upper and lower movement drive mechanism 3 interposed therebetween, a spindle 16 held by the spindle support 4, a tool holder (welding head) 5 held by the spindle 16, and the welding tool 6 held by the tool holder (welding head) 5. As illustrated in FIG. 1, for example, a ball screw, a linear guide, or the like is used as the Z-axis upper and lower movement drive mechanism 3, and the spindle support 4 is driven in a Z-axis direction (upper and lower direction) with respect to the apparatus body 2 by a Z-axis upper and lower movement drive motor 17.

The welding tool 6 includes a shoulder 7 and a probe (welding pin) 8, and is coupled (directly coupled in FIG. 1) to a spindle motor 15. The spindle motor 15 rotates the welding tool 6 in a predetermined direction.

The apparatus body 2 supports the spindle support 4 with the Z-axis upper and lower movement drive mechanism 3 interposed therebetween, and gives a drive signal from a control unit (control device) 12 mounted (attached) to the apparatus body 2 to the spindle motor 15 to move the welding tool 6 along a welding line while rotating the welding tool. That is, the apparatus body 2 holds the spindle support 4, the spindle 16, and the tool holder (welding head) 5, rotates the welding tool 6, and moves the welding tool 6 in an X-axis direction and the Z-axis direction of FIG. 1.

The welding target members 9 are softened by frictional heat generated by pressing the shoulder 7 and the probe 8 against the welding line on surfaces of the welding target members 9 (9a and 9b) mounted on a mounting table 10 while rotating the welding tool 6 at a predetermined rotation speed, the shoulder 7 and the probe 8 are inserted into the welding target members by a necessary quantity, a plastic flow occurs by maintaining the rotation speed, and the inserted portion is stirred. The stirred portion (welded portion) is cooled by pulling out or moving the welding tool, and the welding target members 9 are welded.

FIG. 1 illustrates a configuration in which the tool holder (welding head) 5 and the welding tool 6 are connected to (held by) the apparatus body 2 with the spindle 16, the spindle support 4, and the Z-axis upper and lower movement drive mechanism 3 interposed therebetween, but the present invention is not limited thereto. For example, a configuration in which the tool holder (welding head) and the welding tool are connected to (held by) the apparatus body 2 with only the Z-axis upper and lower movement drive mechanism 3 interposed therebetween, a configuration in which the tool holder (welding head) and the welding tool are connected to (held by) the apparatus body 2 with another movable means interposed therebetween, a configuration in which the tool holder (welding head) 5 and the welding tool 6 are directly connected to (held by) the apparatus body 2, a configuration in which a C-type frame is further provided between the tool holder (welding head) 5 and the apparatus body 2 in the configuration of FIG. 1, and a configuration in which the tool holder (welding head) and the welding tool are connected to (held by) the apparatus body 2 having a multi-axis robot arm are included in the scope of the present embodiment.

A welding tool (that is, the probe is not provided, and only the shoulder is provided) in which the shoulder 7 and the probe (welding pin) 8 are the same may be used, or may have a structure in which the shoulder 7 does not rotate.

The control unit (control device) 12 that controls an operation of the friction stir welding apparatus 1 is installed in (attached to) the apparatus body 2. The control unit (control device) 12 includes a storage unit (not illustrated) that stores welding parameters (FSW welding conditions) such as a welding condition signal for deciding a welding condition by the welding tool 6 and a holding position decision signal for deciding a holding position of the welding tool 6 in a vertical direction (Z direction) (an insertion quantity of the welding pin 8) by the Z-axis upper and lower movement drive mechanism 3.

An X-axis front and back drive mechanism 13 that can be driven in the X-axis direction is provided in the apparatus body 2, and the tool holder (welding head) 5 and the welding tool 6 can be moved in the X-axis direction (welding direction) by moving an upper portion of the apparatus body 2 along a rail of a linear guide provided in the X-axis direction by an X-axis front and back drive motor 14.

Here, a relationship between the load factor and the welding tool position will be described with reference to FIG. 3A. FIG. 3A is a diagram conceptually illustrating the relationship between the load factor and the welding tool position.

As illustrated in FIG. 3A, the welding tool position is related to the load factor of the spindle motor 15. As illustrated in A of FIG. 3A, when the welding tool position is appropriate, the load factor is appropriately maintained. However, as illustrated in B of FIG. 3A, the load factor is high as the welding tool position is high, and conversely, as illustrated in C of FIG. 3A, the load factor is low as the welding tool position is low.

Figure 4:
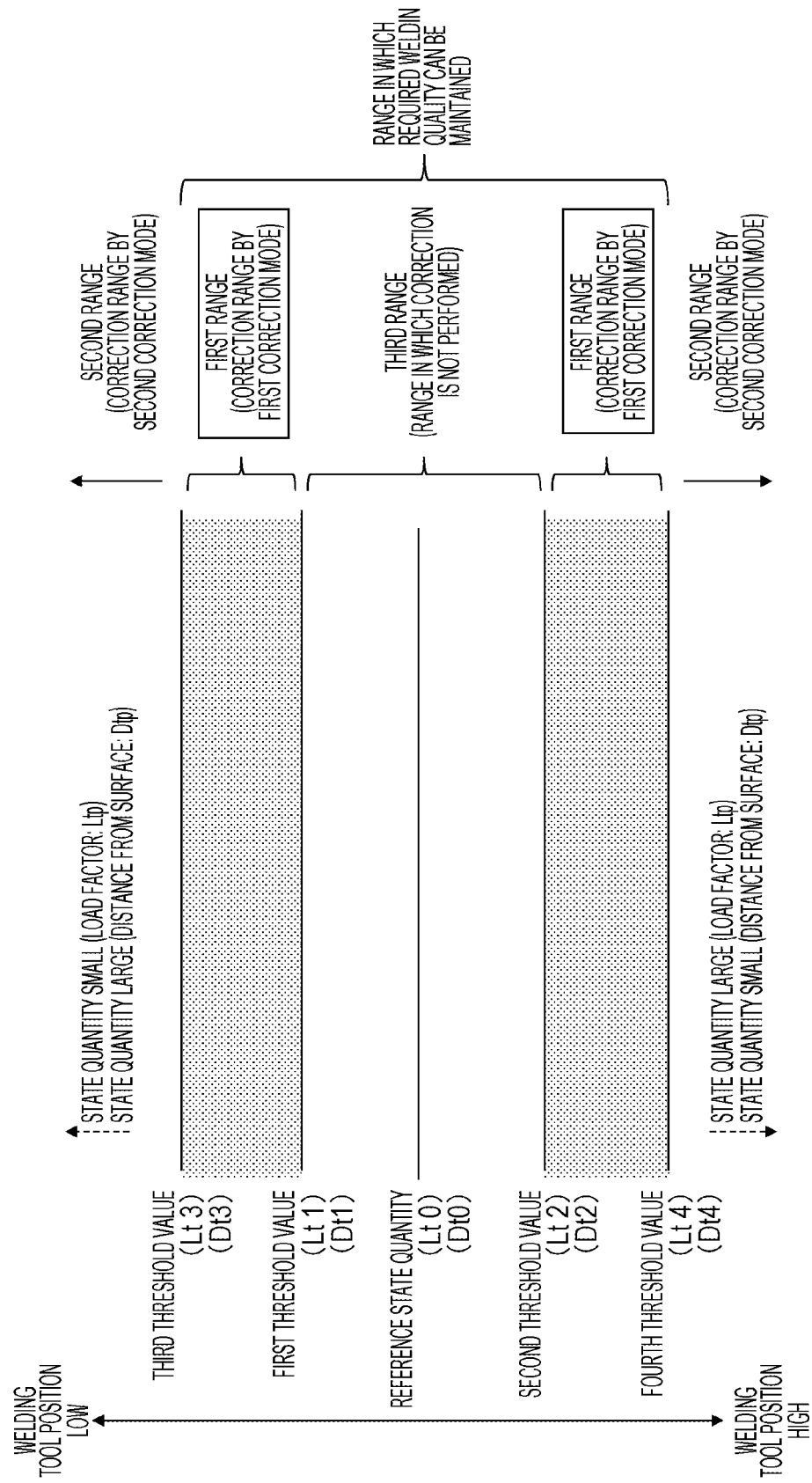
FIG. 4 is a diagram conceptually illustrating a relationship between a correction range, a state quantity (load factor, or distance from surface), and the welding tool position.

The control of the friction stir welding apparatus 1 according to the present embodiment will be described with reference to FIGS. 2, 4, and 5. FIG. 4 is a diagram conceptually illustrating a relationship between a correction range, the state quantity (load factor or distance from surface), and the welding tool position. The relationship between the distance from the surface in FIG. 4, the correction range, and the welding tool position will be described later in a second embodiment. FIG. 5 is a diagram illustrating an example of a database of a fixed correction quantity in a second range (correction range by a second correction mode) of FIG. 4.

As illustrated in FIG. 4, in the present embodiment, a Z-axis position (position in the vertical direction) of the welding tool 6 is classified into the following three ranges, and a correction value for correcting the Z-axis position is set in each range.

First Range (Correction Range by First Correction Mode): Variable Quantity Correction Range In this range, in order to perform appropriate variable quantity correction, the apparatus body 2 (control unit 12) applies a correction quantity (variable correction quantity) calculated by a predetermined operational expression according to a fluctuation quantity of the load factor to the Z-axis upper and lower movement drive motor 17 to drive the Z-axis upper and lower movement drive motor by the correction quantity, and moves the Z-axis upper and lower movement drive mechanism 3 in a Z-axis upper direction (or a Z-axis lower direction) to correct the welding tool position which is the position of the welding tool 6 held by the spindle 16 and the tool holder 5.

The apparatus body 2 (control unit 12) sets a reference load factor (Lt0) as a reference value of the load factor of the spindle motor 15 as a target, a first threshold value (Lt1) separated from the reference load factor (Lt0) by a predetermined quantity in a direction in which the load factor is low, and a second threshold value (Lt2) separated from the reference load factor by a predetermined quantity in a direction in which the load factor is high based on the welding conditions corresponding to the welding target members 9 (9a and 9b).

The apparatus body 2 (control unit 12) sets a third threshold value (Lt3) larger than the first threshold value (Lt1) and separated from the reference load factor (Lt0) in the direction in which the load factor is low and a fourth threshold value (Lt4) larger than the second threshold value (Lt2) and separated from the reference load factor (Lt0) in the direction in which the load factor is high.

A range defined by the first threshold value (Lt1) and the third threshold value (Lt3) and a range defined by the second threshold value (Lt2) and the fourth threshold value (Lt4) are set as a first range, and is set as a variable quantity correction range (correction range by the first correction mode) in which the variable quantity correction is performed.

This first range is a range in which required welding quality can be secured, is a range in which correction is performed with a correction quantity calculated by an arithmetic operation without performing large correction at a time, and is a range in which correction is not performed in JP 2003-80380 A described above.

Second Range (Correction Range by Second Correction Mode): Fixed Quantity Correction Range The second range is a range in which the load factor fluctuates in a direction in which the load factor is smaller than the third threshold value (Lt3) or fluctuates in a direction in which the load factor is larger than the fourth threshold value (Lt4) and a fluctuation quantity of the welding tool position is the largest, and is a range in which the required welding quality cannot be maintained.

In this range, the apparatus body 2 (control unit 12) acquires the correction quantity (fixed correction quantity) corresponding to the acquired current load factor from a database (DB) prepared in advance, and corrects the welding tool position. This range is set as the second range, and is set as the fixed quantity correction range (correction range by the second correction mode) in which the fixed quantity correction is performed.

In the DB, the correction quantity may be set according to the load factor and may be stored in the apparatus body 2 (within control unit 12), or may be stored in external storage means and may be given by communication or the like. Lmax is set as a maximum value of the correction quantity in the DB. Lmax is a maximum value of an actual movement quantity of the welding tool 6 measured and set by an experiment or the like, and is a maximum quantity when the apparatus body 2 (control unit 12) corrects the welding tool position by one sampling.

This second range is a range in which correction is performed in JP 2003-80380 A.

Third Range (Normal Control): Range in which Correction is not Required

A range is defined by the first threshold value (Lt1) and the second threshold value (Lt2), is a range in which the fluctuation of the welding tool position is extremely small, and is a range in which it is not necessary to correct the welding tool position. The apparatus body 2 (the control unit 12) sets this range as the third range, and uses this range as a range in which correction is not required even though the load factor fluctuates.

First, control in the first range (correction range by the first correction mode) for performing the variable quantity correction will be described.

Here, a specific control method will be described for the correction of the fluctuation quantity when the current load factor (Ltp) enters the first range (an upper side of the first range) above the reference load factor (Lt0). However, the same applies to a case where the current load factor (Ltp) enters the first range (a lower side of the first range) below the reference load factor.

When the current load factor enters the upper side of the first range, a correction quantity per sampling is calculated in the first correction mode in which a coefficient obtained by dividing a value calculated by subtracting the first threshold value (Lt1) from the current load factor (Ltp) by a value calculated by subtracting the first threshold value (Lt1) from the third threshold value (Lt3) is multiplied by the maximum movement quantity (Lmax).

The apparatus body 2 (control unit 12) corrects the Z-axis position (position in the vertical direction) of the tool holder 5 (welding tool 6) based on the correction value. As described above, it is possible to reduce the number of times the welding tool position enters the second range (correction range by the second correction mode) by performing the variable quantity correction in the first range (correction range by the first correction mode), and it is possible to suppress an increase in the correction value per one time.

The correction mode in this range is referred to as a "first correction mode".

A calculation example for obtaining the correction quantity in the first correction mode is represented in Equation (1).

Parameters are assumed as follows.
Third threshold value (Lt3): 16(%)
First threshold value (Lt1): 12(%)
Current load factor (Ltp): 14(%)
Maximum movement quantity (Lmax): 20 (μm)

$$\text{Correction quantity} = (Ltp - Lt1)/(Lt3 - Lt1) \times Lmax = 10 \text{ (μm)} \quad (1)$$

Here, as the parameters used for the calculation of the above Equation (1), load factors that are ratios (%) when a rated value of the load torque (current value) of the spindle motor 15 is set to 100 are used as Ltp, Lt1, and Lt3, and a numerical value (μm) indicating the maximum movement quantity of the welding tool 6 is used as Lmax. However, numerical values (distances from the surfaces of the welding target members acquired by the distance measuring sensor 11 to a predetermined position of the tool holder (welding head) 5 (welding tool 6), and the like) indicating the actual movement quantity of the welding tool 6 may be used as all the threshold values. These parameters will be described in detail in the second embodiment.

Next, control in the second range (correction range by the second correction mode) in which the fixed quantity correction is performed will be described.

In this range, since there is a possibility that the required welding quality cannot be maintained, it is necessary to move the welding tool position to the first range (the correction range by the first correction mode) as soon as possible. Thus, when the welding tool position is corrected, it is desirable to perform correction as large as possible within a range in which the current load factor (Ltp) does not overshoot to an opposite side.

FIG. 5 illustrates an example of DB of the fixed correction quantity in the second range (correction range by the second correction mode). In this range, the apparatus body (the control unit 12) acquires the correction quantity corresponding to the fluctuation quantity in which the welding tool position exceeds the third threshold value (Lt3) or the fourth threshold value (Lt4) from the database to correct the welding tool position.

The correction mode in this range is referred to as a "second correction mode".

Finally, control in the third range (normal control range) in which correction is not required will be described.

In this range, as described above, the welding tool position is not corrected even though the load factor fluctuates.

Figure 6:
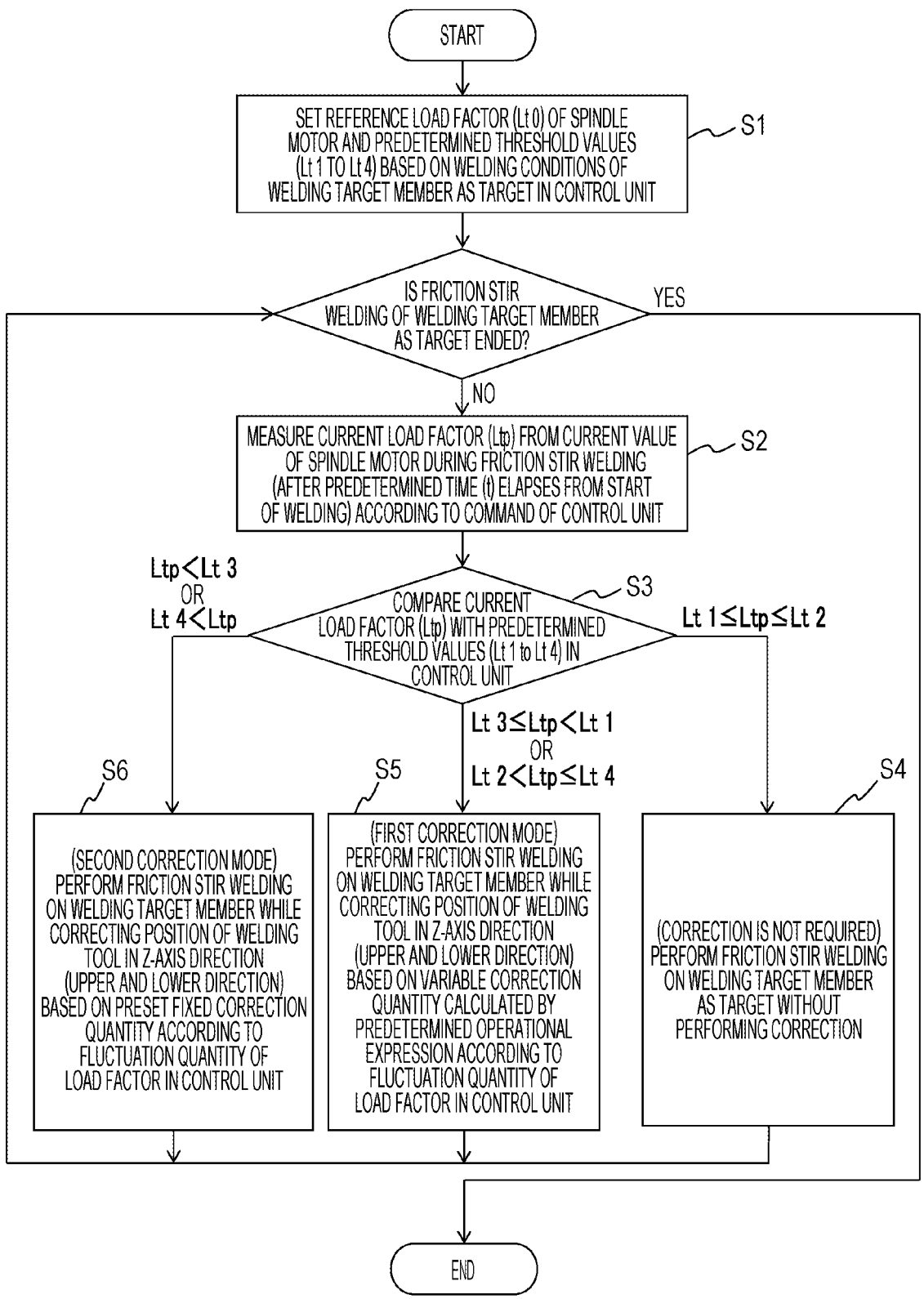
FIG. 6 is a flowchart illustrating a friction stir welding method according to the first embodiment of the present invention.

The friction stir welding method according to the present embodiment will be described with reference to FIG. 6.

First, the control unit (control device) 12 sets the reference load factor (Lt0) of the spindle motor 15 and predetermined threshold values (Lt1 to Lt4) based on the welding conditions of the welding target members 9 (9a and 9b). (step S1)

Subsequently, the current load factor (Ltp) is measured from the current value of the spindle motor 15 during friction stir welding (after a predetermined time (t) elapses from the start of welding) according to a command of the control unit (control device) 12. (step S2)

Subsequently, the control unit (control device) 12 compares the current load factor (Ltp) with the predetermined threshold values (first threshold value: Lt1 to fourth threshold value: Lt4). (step S3)

When it is determined in step S3 that the current load factor (Ltp) falls within the range of the first threshold value (Lt1) and the second threshold value (Lt2) (Lt1<=Ltp<=Lt2), the friction stir welding (normal control) of the welding target members 9 (9a and 9b) is continued. (step S4)

When it is determined in step S3 that the current load factor (Ltp) is equal to or smaller than the third threshold value (Lt3) and is smaller than the first threshold value (Lt1) (Lt1>Ltp>=Lt3) or when it is determined that the current load factor (Ltp) is larger than the second threshold value (Lt2) and is equal to or smaller than the fourth threshold value (Lt4) (Lt2<Ltp<=Lt4), the control unit (control device) 12 performs the friction stir welding on the welding target members 9 (9a and 9b) in the "first correction mode" while correcting the position of the welding tool 6 in the Z-axis direction (vertical direction) based on the variable correction quantity calculated by a predetermined operational expression according to the fluctuation quantity of the load factor. (step S5)

Here, as the predetermined operational expression for obtaining the variable correction quantity, for example, in the above Equation (1), the load factors of the spindle motor 15 are used for Ltp, Lt1, and Lt3, and an operational expression using the numerical value (μm) indicating the maximum value of the actual movement quantity of the welding tool 6 measured and set by experiment or the like is used for Lmax.

On the other hand, when it is determined in step S3 that the current load factor (Ltp) is smaller than the third threshold value (Lt3) (Ltp<Lt3) or when it is determined that the current load factor (Ltp) is larger than the fourth threshold value (Lt4) (Ltp>Lt4), the control unit (control device) 12 performs the friction stir welding of the welding target members 9 (9a and 9b) in the "second correction mode" while correcting the position of the welding tool 6 in the Z-axis direction (vertical direction) based on the preset fixed correction quantity according to the fluctuation quantity of the load factor. (step S6)

Thereafter, when it is determined that the current load factor (Ltp) is a load factor equal to or larger than the third threshold value (Lt3) and is smaller than the first threshold value (Lt1) (Lt3=<Ltp<Lt1) or when it is determined that the current load factor (Ltp) is a load factor larger than the second threshold value (Lt2) and equal to or smaller than the fourth threshold value (Lt4) (Lt2<Ltp<=Lt4), the processing proceeds to step S5, and the friction stir welding is performed in the "first correction mode".

Finally, at the time when the movement quantity (elapsed time) of the welding tool 6 reaches a predetermined value (position or time) according to a command from the control unit (control device) 12, the welding tool 6 is pulled out from the welded portions of the welding target members 9 (9a and 9b), and the friction stir welding processing is ended. (step S7)

Second Embodiment

Basic Control According to Present Embodiment

In a friction stir welding apparatus and a friction stir welding method according to the present embodiment, when a current state quantity during the friction stir welding is smaller than a reference state quantity, a welding head position is corrected in the Z-axis upper direction (vertically upper direction) by an absolute value of the calculated correction quantity, and when the current state quantity is larger than the reference state quantity, the Z-axis upper and lower movement drive mechanism is controlled so as to correct the welding head position in the Z-axis lower direction (vertically lower direction) by the absolute value of the calculated correction quantity.

In the present embodiment, friction stir welding for controlling (correcting) the welding tool position by using the distances from the surfaces of the welding target members to a predetermined position of the welding head as the "state quantity" will be described.

In the friction stir welding apparatus according to the present embodiment, a distance measuring sensor 11 is provided on the spindle 16. The distance measuring sensor 11 is disposed in a traveling direction (welding direction) of the welding tool 6 at the time of welding, and measures distances between a predetermined position of the spindle 16 (distance measuring sensor 11) and predetermined positions of the surfaces of the welding target members 9 (9a and 9b) or the mounting table 10 on which the welding target members 9 (9a and 9b) are mounted.

As the distance measuring sensor 11, for example, a non-contact type displacement sensor such as a laser displacement sensor using a laser is used. Alternatively, a contact type displacement sensor such as a linear gauge may be used as long as distance measurement and friction stir welding processing are not affected.

Figure 7:
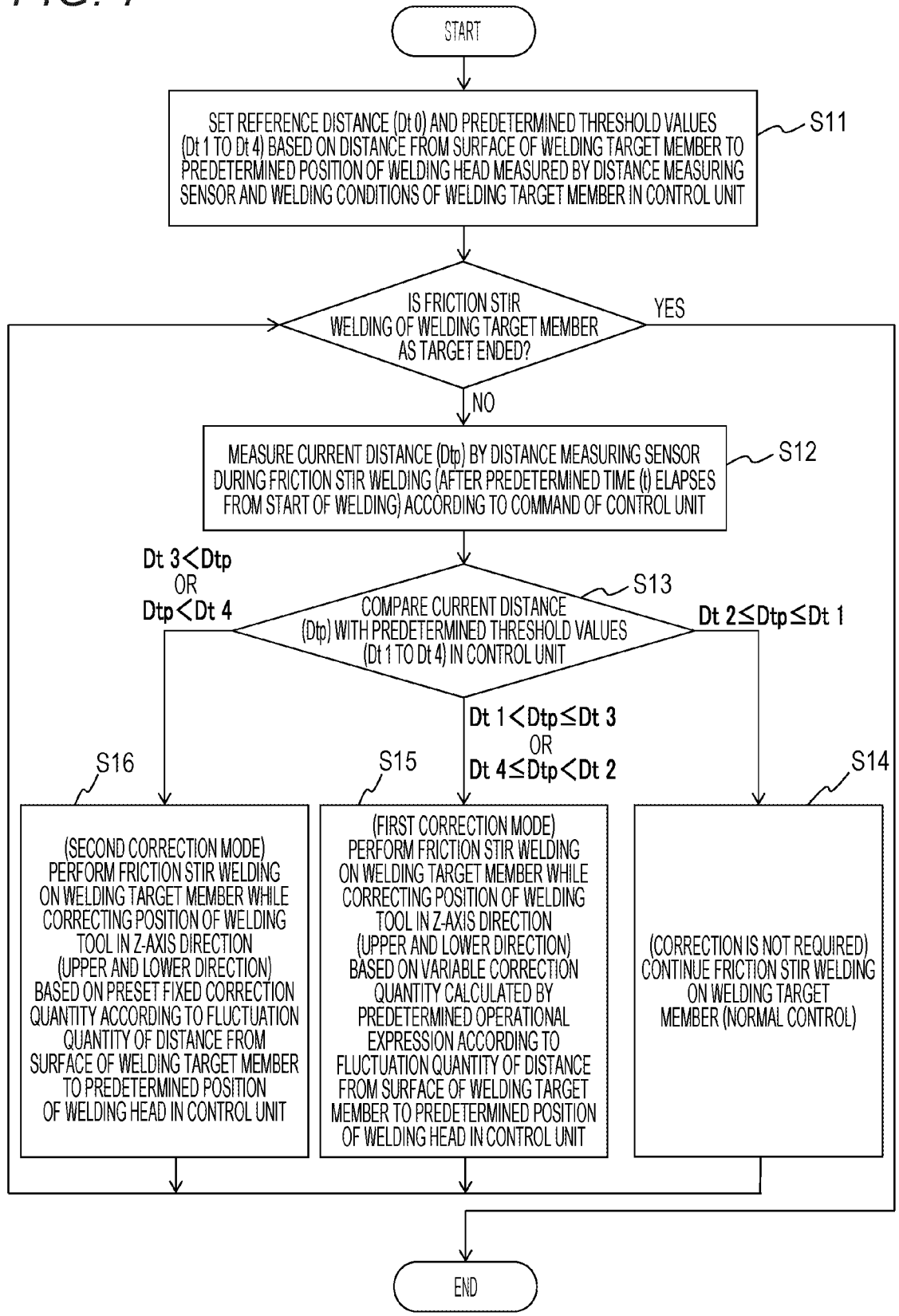
FIG. 7 is a flowchart illustrating a friction stir welding method according to a second embodiment of the present invention.

The friction stir welding method according to the second embodiment of the present invention will be described with reference to FIGS. 3B and 7. In the present embodiment, the correction of the welding tool position using the state quantity measured by the distance measuring sensor 11 described in FIG. 1 will be described.

First, a relationship between the welding tool position and the distances from the surfaces of the welding target members to the predetermined position of the welding head, that is, the state quantity will be described with reference to FIG. 3B. FIG. 3B is a diagram conceptually illustrating the relationship between the welding tool position and the state quantity.

Figure 3B:
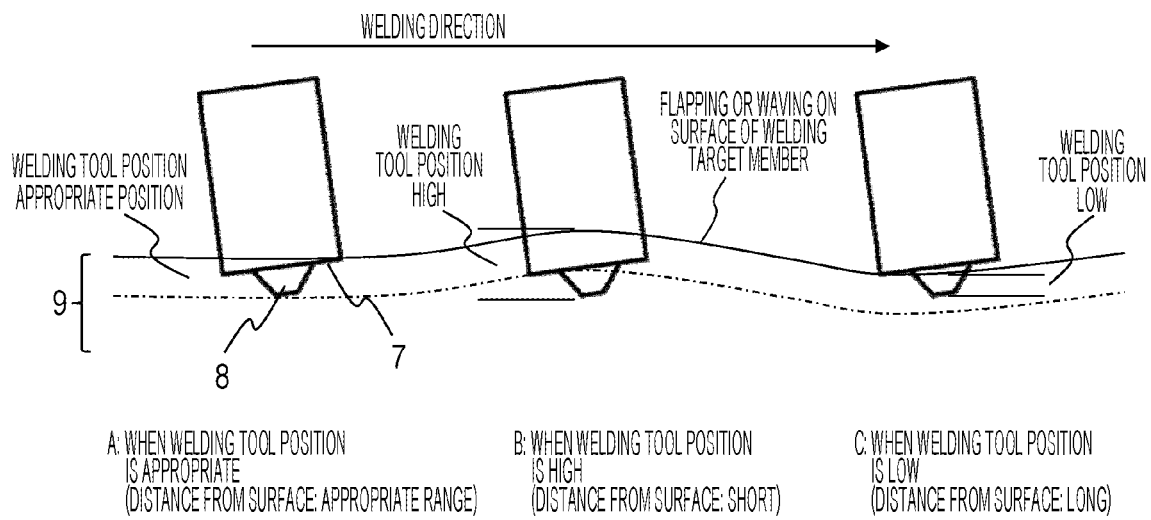
FIG. 3B is a diagram conceptually illustrating a relationship between the welding tool position and distances from surfaces of welding target members to a predetermined position of a welding head.

As illustrated in FIG. 3B, the welding tool position is related to the state quantity. As illustrated in A of FIG. 3B, when the state quantity is within an appropriate range, the welding tool position is appropriately maintained. On the other hand, as illustrated in B of FIG. 3B, when the state quantity is smaller than the appropriate range, the welding tool position is located in the Z-axis lower direction of the appropriate range. On the other hand, as illustrated in C of FIG. 3B, when the state quantity is larger than the appropriate range, the welding tool position is located in the Z-axis upper direction of the appropriate range.

The friction stir welding method according to the present embodiment will be described with reference to FIG. 7.

First, the control unit (control device) 12 sets a reference distance (Dt0) which is a state quantity as an appropriate position of the welding tool 6 and threshold values (Dt1 to Dt4) as predetermined state quantities based on the welding conditions or the like of the welding target members 9 (9a and 9b). (step S11) (see FIGS. 1 to 3)

Next, a current distance (Dtp) which is a state quantity in a current time is measured by the distance measuring sensor 11 during the friction stir welding (after a predetermined time (t) elapses from the start of welding) according to a command from the control unit (control device) 12. (step S12) (see FIG. 2)

Next, the control unit (control device) 12 compares the current distance (Dtp) with the predetermined threshold values (first threshold value: Dt1 to fourth threshold value: Dt4). (step S13)

When it is determined in step S13 that the current distance (Dtp) falls within the range of the second threshold value (Dt2) and the first threshold value (Lt1) (Dt2<=Dtp<=Dt1), the desired welding quality can be maintained in this range, it is not necessary to correct the welding tool position, and the friction stir welding (normal control) of the welding target members 9 (9a and 9b) is continued. (step S14)

When it is determined in step S13 that the current distance (Dtp) is larger than the first threshold value (Dt1) and is equal to or smaller than the third threshold value (Dt3) (Dt1<Dtp<=Dt3) or when it is determined that the current distance (Dtp) is equal to or larger than the fourth threshold value (Dt4) and is smaller than the second threshold value (Dt2) (Dt4<=Dtp<Dt2), the desired welding quality can be maintained in this range. However, the control unit (control device) 12 performs the correction according to the fluctuation quantity (small fluctuation) of the current distance (Dtp), and performs the friction stir welding on the welding target members 9 (9a and 9b) in the "first correction mode" while correcting the welding tool position based on the variable correction quantity calculated by a predetermined operational expression according to the fluctuation quantity of the distance. (step S15)

Here, as the predetermined operational expression for obtaining the variable correction quantity, for example, in the above Equation (1), Ltp, Lt1, and Lt3 are replaced with Dtp, Dt1, and Dt3, and the same numerical value is used for Lmax.

On the other hand, when it is determined in step S13 that the current distance (Dtp) is larger than the third threshold value (Dt3) (Dtp>Dt3) or when it is determined that the current distance (Dtp) is smaller than the fourth threshold value (Dt4) (Dtp<Dt4), the control unit (control device) 12 performs the friction stir welding on the welding target members 9 (9a and 9b) in the "second correction mode" while correcting the position of the welding tool 6 in the Z-axis direction (vertical direction) based on the preset fixed correction quantity according to the fluctuation quantity of the distance. (step S16)

Thereafter, when it is determined that the current distance (Dtp) is larger than the first threshold value (Dt1) and is equal to or smaller than the third threshold value (Dt3) (Dt1<Dtp<=Dt3) or when it is determined that the current distance (Dtp) is equal to or larger than the fourth threshold value (Dt4) and is smaller than the second threshold value (Dt2) (Dt4<=Dtp<Dt2), the processing proceeds to step S15, and the friction stir welding is performed in the "first correction mode".

Finally, at the time when the movement quantity (elapsed time) of the welding tool 6 reaches a predetermined value (position or time) according to a command from the control unit (control device) 12, the welding tool 6 is pulled out from the welded portions of the welding target members 9 (9a and 9b), and the friction stir welding processing is ended. (step S17)

The present invention is not limited to the aforementioned embodiments, and includes various modification examples. For example, the aforementioned embodiments are described in detail in order to facilitate easy understanding of the present invention, and are not limited to necessarily include all the described components. Furthermore, some of the components of a certain embodiment can be substituted into the components of another embodiment, and the components of another embodiment can be added to the component of a certain embodiment. Furthermore, another component can be added, removed, and substituted to, from, and into some of the components of the aforementioned embodiments.

What is claimed is:

1. A friction stir welding apparatus comprising:
   a welding tool that includes a shoulder and a probe supported by the shoulder, is inserted into a plurality of welding target members, and moves while rotating to weld the plurality of welding target members;
   a spindle motor that is coupled to the welding tool to rotate the welding tool in a predetermined direction;
   a welding head that supports the spindle motor; and
   an apparatus body that supports the welding head, applies a drive signal to the spindle motor, and moves the welding tool along a welding line while rotating the welding tool, wherein
   the apparatus body has a first correction mode in which a welding tool position indicating a position of the welding tool in a Z-axis direction is corrected based on a variable correction quantity calculated by a predetermined operational expression according to a fluctuation quantity of a state quantity indicating a control quantity of the welding head in a Z-axis upper direction or a Z-axis lower direction when friction stir welding is performed on the welding target members by the welding tool, and a second correction mode in which the welding tool position is corrected based on a preset fixed correction quantity according to the fluctuation quantity.

2. The friction stir welding apparatus according to claim 1, wherein
   the apparatus body
   sets a reference state quantity which is a reference of the state quantity, a first threshold value separated from the reference state quantity in a direction in which the state quantity is small by a predetermined quantity, a second threshold value separated from the reference state quantity in a direction in which the state quantity is large by a predetermined quantity, a third threshold value which is larger than the first threshold value and is separated from the reference state quantity in the direction in which the state quantity is small by a predetermined quantity, and a fourth threshold value which is larger than the second threshold value and is separated from the reference state quantity in the direction in which the state quantity is large by a predetermined quantity,
   executes the first correction mode when the state quantity is between the first threshold value and the third threshold value or when the state quantity is between the second threshold value and the fourth threshold value, and
   executes the second correction mode when the state quantity exceeds the third threshold value in a direction of being further separated from the reference state quantity or when the state quantity exceeds the fourth threshold value in a direction of being further separated from the reference state quantity.

3. The friction stir welding apparatus according to claim 2, wherein
   in the first correction mode, the apparatus body calculates the variable correction quantity by multiplying a coefficient calculated by dividing a difference calculated by subtracting the first threshold value from a current state quantity which is a state quantity in a current time by a difference calculated by subtracting the first threshold value from the third threshold value by a maximum movement quantity of the welding tool as a maximum correction quantity for correcting the welding tool position for each setting based on welding conditions corresponding to the welding target members, or calculates the variable correction quantity by multiplying a coefficient calculated by dividing a difference calculated by subtracting the second threshold value from the current state quantity by a difference calculated by subtracting the second threshold value from the fourth threshold value by the maximum movement quantity.

4. The friction stir welding apparatus according to claim 3, wherein in the second correction mode, the apparatus body acquires a correction value corresponding to a quantity by which the current state quantity fluctuates in a direction of being further separated from the reference state quantity than the third threshold value or a correction value corresponding to a quantity by which the state quantity fluctuates in a direction of being further separated from the reference state quantity than the fourth threshold value from a correction value corresponding to a fluctuation quantity of the current state quantity set for a database in advance with the maximum movement quantity as a maximum value, and decides the fixed correction quantity.

5. The friction stir welding apparatus according to claim 3, wherein
the apparatus body sets the reference state quantity, the current state quantity, the first threshold value, the second threshold value, the third threshold value, and the fourth threshold value by numerical values indicating load factors which are ratios for load torque of the spindle motor or a rated current of the spindle motor generated when the welding tool is inserted in the welding target members while the welding tool is rotated.

6. The friction stir welding apparatus according to claim 3, wherein
the apparatus body sets the reference state quantity, the current state quantity, the first threshold value, the second threshold value, the third threshold value, and the fourth threshold value by numerical values indicating distances from surfaces of the welding target members to a predetermined position of the welding head when the welding tool is inserted in the welding target members while the welding tool is rotated.

7. The friction stir welding apparatus according to claim 1, wherein
the apparatus body maintains the state quantity in a predetermined range by moving a spindle support that couples the apparatus body and the welding head by a Z-axis upper and lower movement drive mechanism up and down to control a Z-axis position of the welding head.

8. The friction stir welding apparatus according to claim 1, wherein
the apparatus body includes a control unit, and
the control unit has the first correction mode and the second correction mode.

9. A friction stir welding method for welding welding target members to each other by friction stir welding, the method comprising:
(a) setting a reference state quantity and a predetermined state quantity range before the friction stir welding is started;
(b) measuring a current state quantity during the friction stir welding; and
(c) comparing the current state quantity with the predetermined state quantity range, wherein
a first correction mode in which a welding tool position indicating a position of a welding tool in a Z-axis direction is corrected based on a variable correction quantity calculated by a predetermined operational expression is executed when the current state quantity measured in (b) is within the predetermined state quantity range, and
a second correction mode in which the welding tool position is corrected based on a preset fixed correction quantity is executed when the current state quantity measured in (b) exceeds the predetermined state quantity range in a direction of being further separated from the reference state quantity.

10. The friction stir welding method according to claim 9, wherein
the predetermined state quantity range includes a state quantity range between a first threshold value separated from the reference state quantity in a direction in which a state quantity is small by a predetermined quantity and a third threshold value that is larger than the first threshold value and is separated from the reference state quantity in a direction in which the state quantity is small by a predetermined quantity, and a state quantity range between a second threshold value separated from the reference state quantity in the direction the state quantity is large by a predetermined quantity and a fourth threshold value that is larger than the second threshold value and is separated from the reference state quantity in the direction in which the state quantity is large by a predetermined quantity.

11. The friction stir welding method according to claim 10, wherein
in the first correction mode, the variable correction quantity is calculated by multiplying a coefficient calculated by dividing a difference calculated by subtracting the first threshold value from a current state quantity by a difference calculated by subtracting the first threshold value from the third threshold value by a maximum movement quantity as a maximum correction quantity for correcting the welding tool position for each setting based on welding conditions of welding tool, or the variable correction quantity is calculated by multiplying a coefficient calculated by dividing a difference calculated by subtracting the second threshold value from the current state quantity by a difference calculated by subtracting the second threshold value from the fourth threshold value by the maximum movement quantity.

12. The friction stir welding method according to claim 11, wherein
in the second correction mode, a correction value corresponding to a quantity by which the current state quantity fluctuates in a direction of being further separated from the reference state quantity than the third threshold value or a correction value corresponding to a quantity by which the current state quantity fluctuates in a direction of being further separated from the reference state quantity than the fourth threshold value is acquired from a correction value corresponding to a fluctuation quantity of the current state quantity set for a database in advance with the maximum movement quantity as a maximum value, and the fixed correction quantity is decided.

13. The friction stir welding method according to claim 11, wherein
the reference state quantity, the current state quantity, the first threshold value, the second threshold value, the third threshold value, and the fourth threshold value are set by numerical values indicating load factors which are ratios for load torque of the spindle motor or a rated current of the spindle motor generated when the welding tool is inserted in the welding target members while the welding tool is rotated.

14. The friction stir welding method according to claim 11, wherein
the reference state quantity, the current state quantity, the first threshold value, the second threshold value, the third threshold value, and the fourth threshold value are set by numerical values indicating distances from surfaces of the welding target members to a predetermined position of a welding head when the welding tool is inserted in the welding target members while the welding tool is rotated, and the maximum movement quantity is set by the welding conditions of the welding target members.

* * * * *